(12) United States Patent
Jevaney (10) Patent No.: US 8,444,116 B2
(45) Date of Patent: May 21, 2013

(54) LIFT ASSEMBLY

(75) Inventor: Fred Jevaney, Elmhurst, IL (US)

(73) Assignee: Randall Manufacturing, Elmhurst, IL (US)

( * ) Notice: Subject to any disclaimer, the term of this patent is extended or adjusted under 35 U.S.C. 154(b) by 336 days.

(21) Appl. No.: 12/879,748

(22) Filed: Sep. 10, 2010

(65) Prior Publication Data

US 2012/0061635 A1    Mar. 15, 2012

(51) Int. Cl.
 *B65D 3/08* (2006.01)
(52) U.S. Cl.
 USPC ............ 254/394; 254/401; 254/402; 410/135
(58) Field of Classification Search
 USPC .................. 254/391, 394, 401, 402; 410/130, 410/135
 See application file for complete search history.

(56) References Cited

U.S. PATENT DOCUMENTS

| | | | | |
|---|---|---|---|---|
| 3,017,842 | A | * | 1/1962 | Nampa ......................... 410/133 |
| 3,574,900 | A | | 4/1971 | Emery |
| 4,019,442 | A | * | 4/1977 | Lee et al. ...................... 410/130 |
| 4,361,938 | A | | 12/1982 | Emery |
| 6,601,829 | B2 | * | 8/2003 | Graham ........................ 254/391 |
| 6,685,171 | B2 | * | 2/2004 | Lob et al. ...................... 254/391 |
| 7,195,435 | B2 | * | 3/2007 | Clark ............................ 410/135 |
| 7,226,043 | B2 | * | 6/2007 | Stone et al. ................... 254/391 |
| 7,234,686 | B2 | * | 6/2007 | Stone et al. ................... 254/391 |
| 7,300,236 | B2 | | 11/2007 | Nelson et al. |
| 7,631,854 | B1 | * | 12/2009 | Mountain ..................... 254/390 |
| 2005/0163584 | A1 | * | 7/2005 | Clark ............................ 410/135 |

* cited by examiner

*Primary Examiner* — Emmanuel M Marcelo
(74) *Attorney, Agent, or Firm* — Brinks Hofer Gilson & Lione (57) ABSTRACT

A lift system is provided. The lift system includes a lift mechanism with a jamming cleat and a guide bracket that urges a tensile member toward the jamming cleat.

18 Claims, 10 Drawing Sheets

LIFT ASSEMBLY

FIELD

The present embodiments relate to assemblies for lifting objects, such as bulkheads in a refrigerated trailer.

BACKGROUND

Bulkheads are used in trailers and the like to divide the trailer into separate storage compartments and, sometimes, to maintain each compartment at a temperature necessary to preserve the goods during transport. It is useful to provide a lift assembly for lifting the bulkheads out of the way so that cargo may be loaded onto, or unloaded from, the trailer.

SUMMARY

A lift mechanism includes a main bracket, a pulley that is rotatably attached to the main bracket, a jamming cleat that is disposed within the main bracket, and a guide bracket that is rotatably attached to the main bracket. The guide bracket is operable to urge a tensile lifting member toward the jamming cleat when the guide bracket is in the rest position.

A lift assembly for lifting a bulkhead in a trailer having a ceiling and a sidewall, includes a first pulley that is rotatably attached to the ceiling of the trailer, a lift mechanism that includes a main bracket, a second pulley that is rotatably attached to the main bracket, and a jamming cleat. The lift assembly also includes a tensile member that is routed over the first pulley and the second pulley.

DETAILED DESCRIPTION OF THE DRAWINGS

Figure 1:
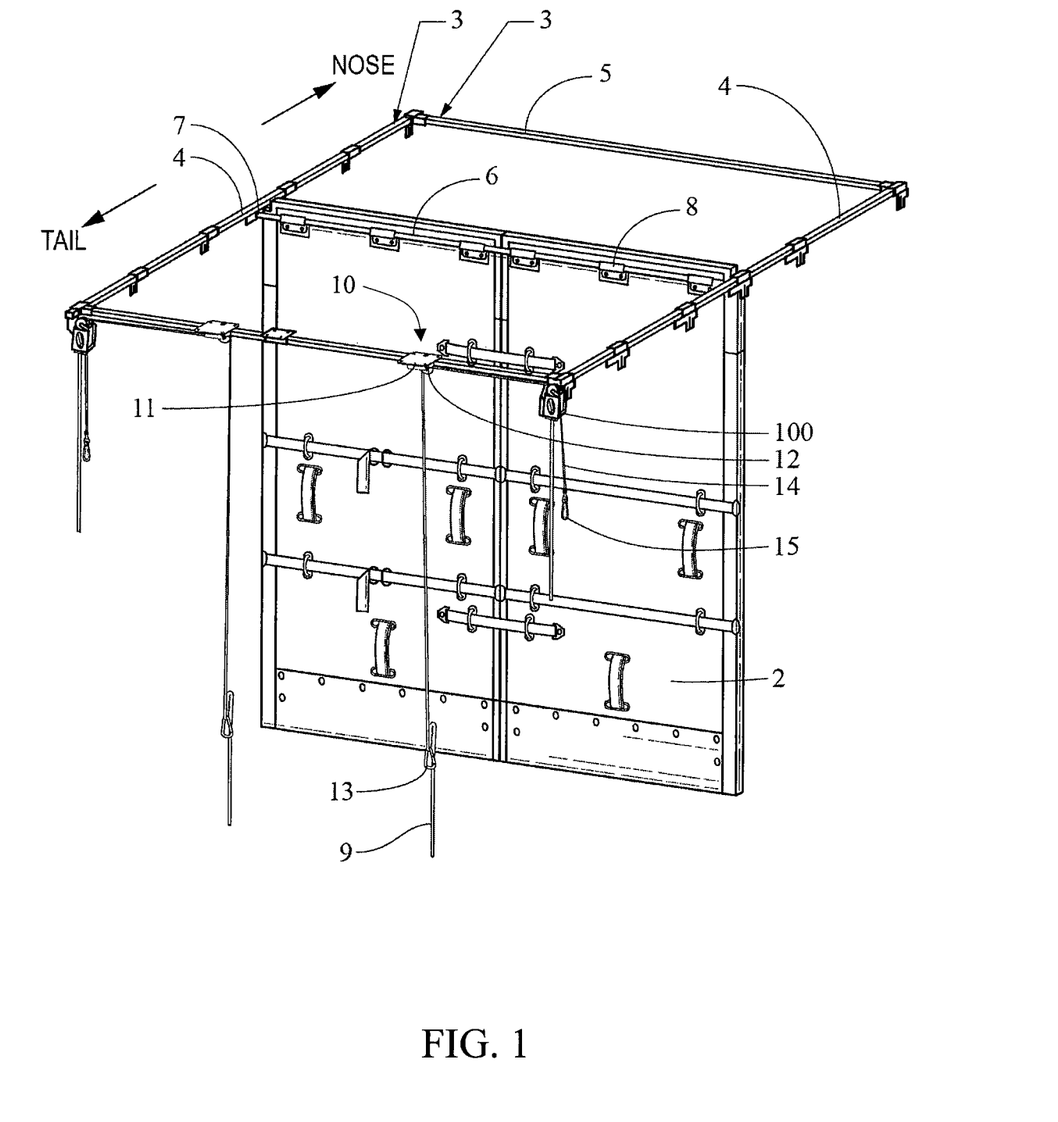
FIG. 1. is a perspective view of one embodiment of a track system and lift system.
Figure 2:
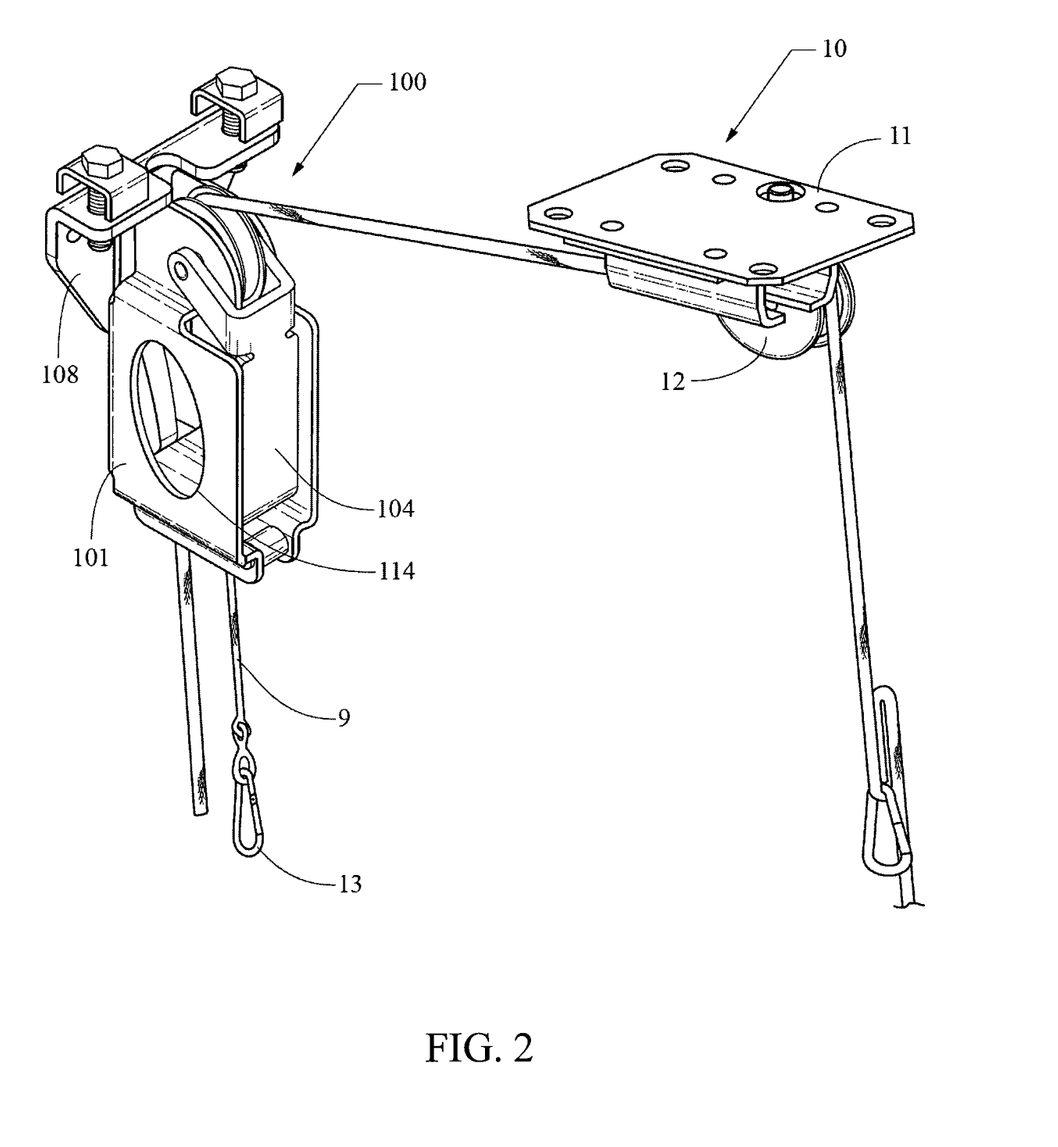
FIG. 2 is a perspective view of one embodiment of a lift system.

As shown in FIGS. 1 and 2, a lift system 1 (e.g., a lift assembly 1) includes a ceiling mechanism 10 and a lift mechanism 100. The lift system 1 may be used for lifting a bulkhead 2 in a trailer. The trailer includes a track system 3. The track system 3 includes longitudinal tracks 4 that run the length of the trailer and transverse tracks 5 that run the width of the trailer.

In one embodiment, a pair of bulkheads 2 is mounted to a pivot pipe 6. The bulkheads 2 are mounted to the pivot pipe 6 with brackets 8 (e.g., each bulkhead 2 is mounted to the pivot pipe 6 with three brackets 8) that allow the bulkheads 2 to pivot about the axis defined by the pivot pipe 6. The pivot pipe 6 spans the width of the trailer. Each end of the pivot pipe 6 is held by a trolley 7. The trolley 7 includes wheels that enable the trolley 7 to move along the longitudinal tracks 4. As a result, the bulkheads 2 may be moved longitudinally within the trailer and may be rotated about the pivot pipe 6 so that the bulkheads 2 move from a vertical orientation to a horizontal orientation adjacent the ceiling.

The ceiling mechanism 10 includes a ceiling mount bracket 11 and a ceiling pulley 12. The ceiling mount bracket 11 includes holes for mounting the bracket 11 to one of the transverse tracks 5 (e.g., four holes in a rectangular pattern). The ceiling pulley 12 is rotatably attached to the ceiling mount bracket 11. In one embodiment, the ceiling pulley 12 may accommodate a rope that is approximately ⅜ inch in diameter. In one embodiment, the ceiling mount bracket 11 is mounted to one of the longitudinal tracks 4.

Figure 3:
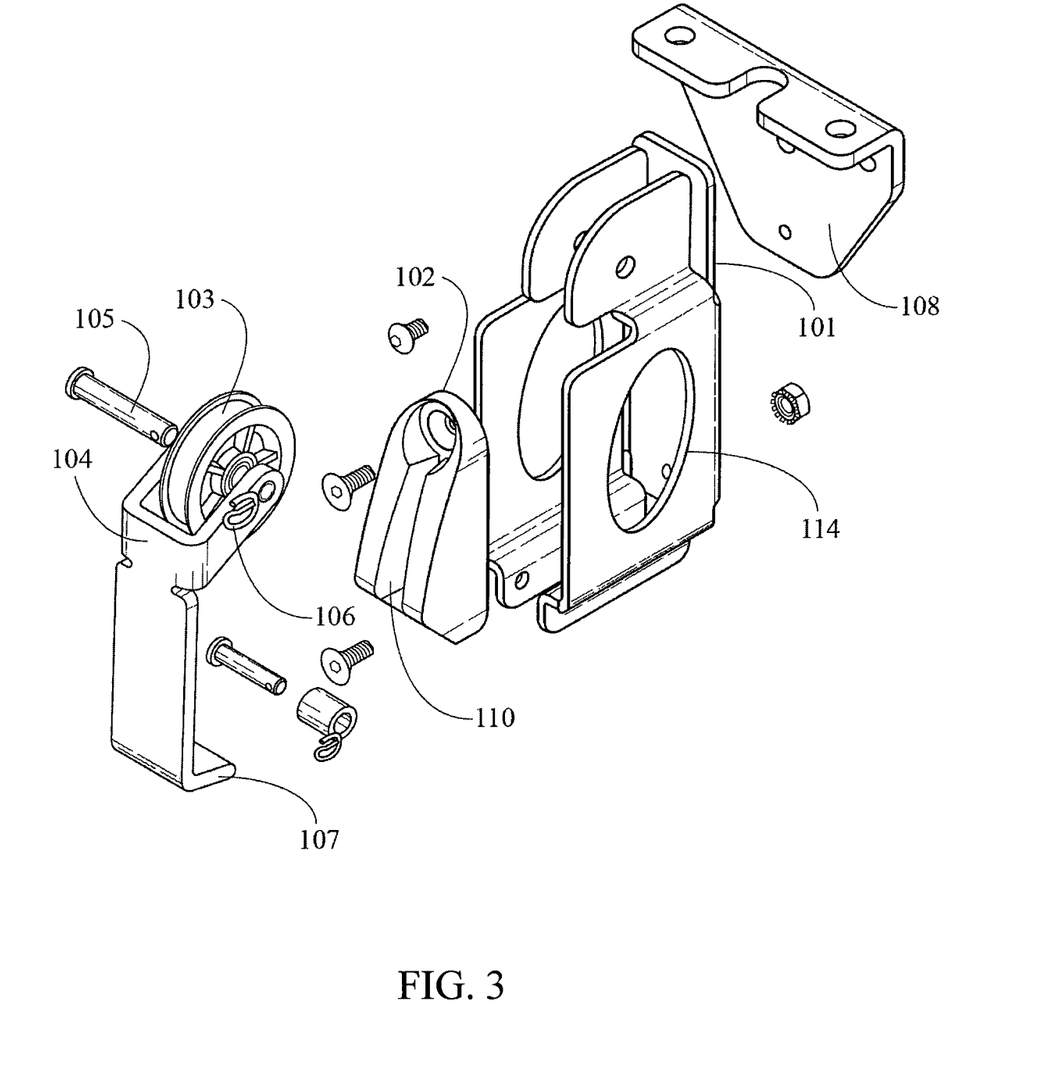
FIG. 3 is an exploded view of component parts of one embodiment of a lift mechanism.
Figure 4:
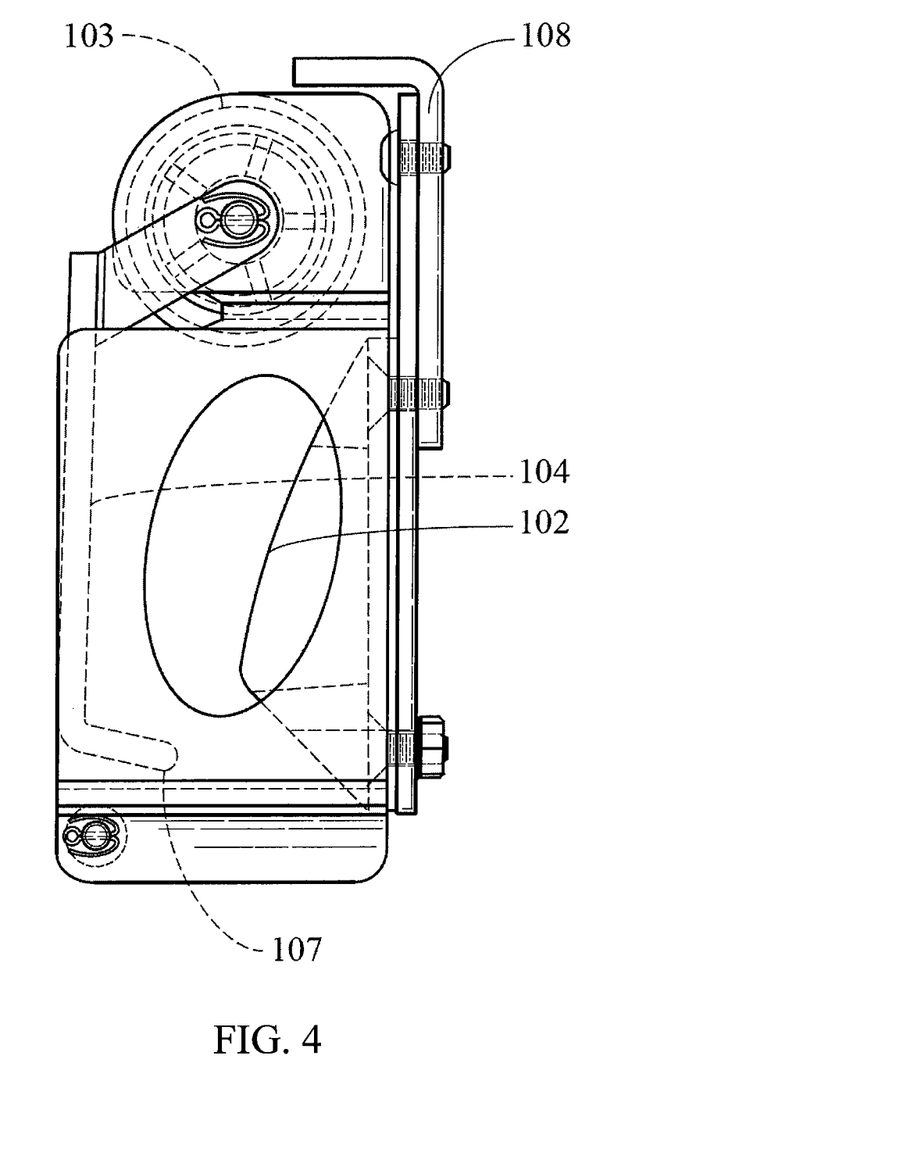
FIG. 4 is a side-view of one embodiment of a lift mechanism.

An exploded view of the component parts of one embodiment of the lift mechanism 100 is shown in FIG. 3. A side view of the assembled lift mechanism 100 is shown in FIG. 4. The lift mechanism 100 includes a main bracket 101, a jamming cleat 102, a pulley 103 and a rope guide bracket 104. The main bracket 101 provides the support structure for the other components (e.g., the jamming cleat 102, the pulley 103 and the rope guide bracket 104) of the lift mechanism 100.

In one embodiment, the jamming cleat 102 is mounted inside the main bracket 101. The jamming cleat 102 is designed to hold a rope in place without slipping. Jamming cleats that may be used in the present embodiments are shown and described, for example, in U.S. Pat. Nos. 3,574,900 and 4,361,938, the disclosures of which are incorporated by reference herein. The jamming cleat 102 includes a groove 110 to receive and grip a rope. The groove 110 has opposed internal faces (e.g., facing sidewalls), which converge toward the bottom of the groove 110. The facing sidewalls that define the groove 110 may include a plurality of ridges. The plurality of ridges on each of the internal faces is inclined from the base of the groove upwardly toward the top of the groove.

In one embodiment, the main bracket 101 includes one or two openings 114 in side walls of the main bracket 101 adjacent the jamming cleat 102. The openings 114 provide easier access to the jamming cleat 102 and may assist in adjusting the rope. Additionally, the openings 114 may simplify the process of feeding the rope through the main bracket 101 upon installation.

The pulley 103 and the rope guide bracket 104 are attached to the main bracket 101 with a clevis pin 105 and a cotter pin 106 (e.g., at corresponding holes in the main bracket 101). The pulley 103 and the rope guide bracket 104 rotate freely about an axis defined by the clevis pin 105. In one embodiment, the pulley 103 has an outside diameter of approximately 2 inches and accommodates a rope diameter of approximately ⅜ inch.

In one embodiment, the rope guide bracket 104 includes a projection 107 that extends toward the jamming cleat 102. The rope guide bracket 104 and the projection 107 are designed so that when the lift mechanism 100 is mounted on a vertical wall and a rope is threaded through the lift mechanism 100, the rope guide bracket 104 applies pressure to the rope and urges the rope into the jamming cleat 102.

The lift mechanism 100 may be attached to one of the longitudinal tracks 4 using a mounting bracket 108. The lift mechanism 100 is mounted so that the jamming cleat 102 is positioned vertically. In one embodiment, the lift mechanism 100 may be attached to one of the transverse tracks 5.

Figure 5:
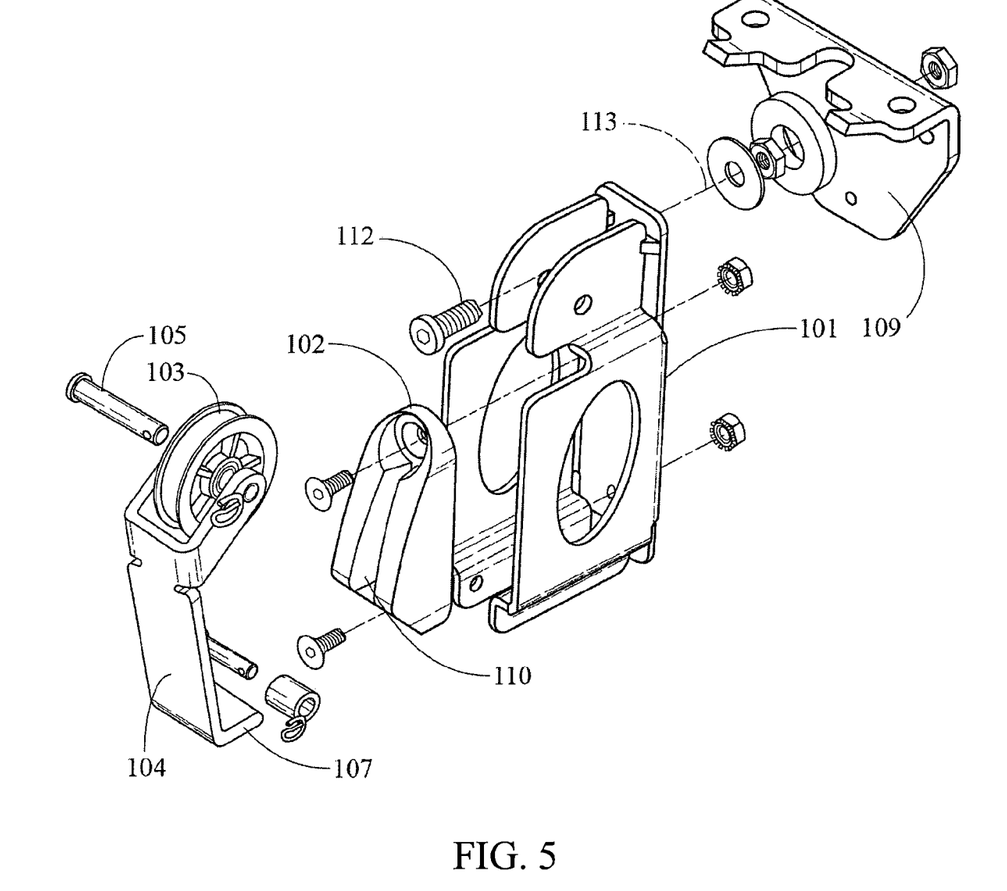
FIG. 5 is an exploded view of component parts of one embodiment of a lift mechanism having a rotation-permitting assembly.
Figure 6:
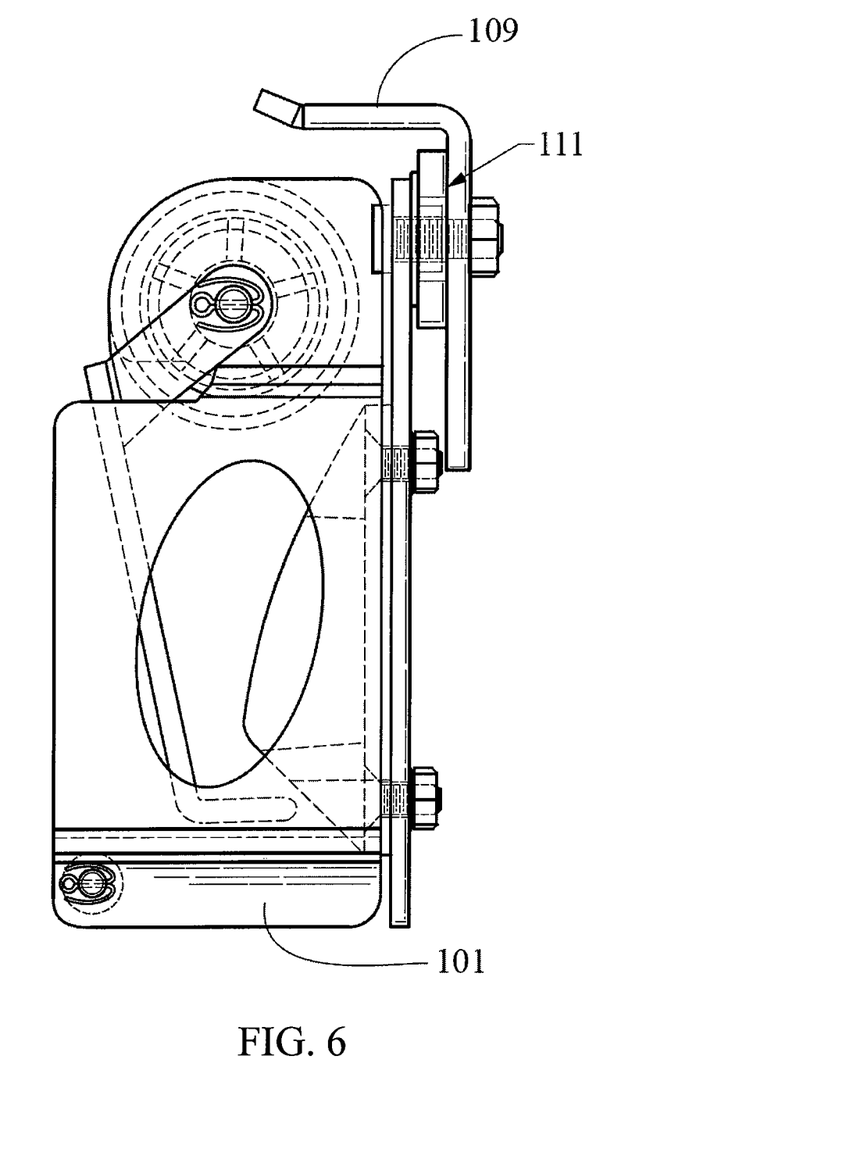
FIG. 6 is a side-view of one embodiment of a lift mechanism having a rotation-permitting assembly.

Alternatively, as shown in FIGS. 5 and 6, the lift mechanism 100 may be attached to one of the longitudinal tracks 4 using a mounting bracket 109. The main bracket 101 may be attached to the mounting bracket 109 with a rotation-permitting assembly 111. (See FIG. 6). The rotation-permitting assembly 111 may include a fastener 112 (e.g., a bolt, machine screw, or pin) that is fit through a hole in the main bracket 101 and another hole in the mounting bracket 109. Various other components including, for example, washers, nuts and/or pins may be used with the fastener 112 in forming the rotation-permitting assembly 111. As shown in FIG. 5, one embodiment of the rotation-permitting assembly 111 includes a bolt 112 fit through a hole in the main bracket 101 and another hole in the mounting bracket 109, a pair of washers (e.g., one with a larger central opening), a nut sandwiched between the main bracket 101 and the mounting bracket 109, and a nut fit about the bolt on the other side of the mounting bracket 109.

The rotation-permitting assembly 111 allows the main bracket 101 to pivot about an axis 113 defined by the fastener 112. The main bracket 101 being able to rotate may reduce stresses applied to the lift mechanism 100, thereby improving operation of the lift mechanism 100.

Figure 7:
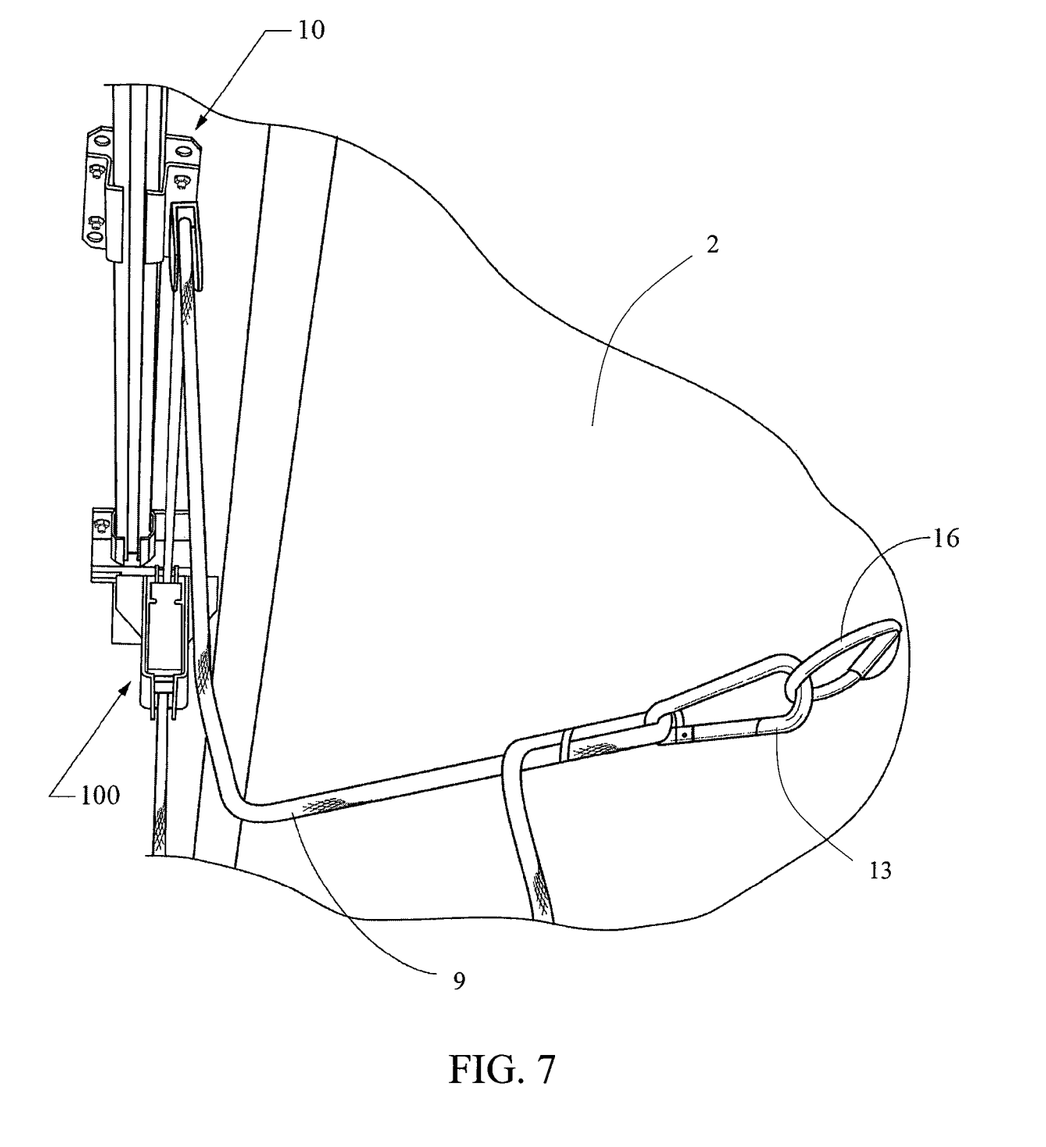
FIG. 7 is a perspective view of a bulkhead adjacent a ceiling of a trailer using one embodiment of a lift system.

In one embodiment, a braided rope 9 is used with the lift system 1 of the present embodiments. However, any suitable tensile member including, for example, a strap or a cable may be used. As shown in FIG. 7, a hook 13 may be attached to one end of the rope 9. Another end of the rope is threaded over the ceiling pulley 12, across the ceiling, over the pulley 103 and down through the main bracket 101, passed over or through the jamming cleat 102, and then out the bottom of the main bracket 101. (See, FIGS. 1, 2 and 7).

The operation of the lift system 1 will now be described. The bulkhead 2 may be lifted to approximately a waist high level. As shown in FIG. 7, a user attaches the hook 13 on the one end of the rope 9 to a D-ring 16 on a back side of the bulkhead 2. The D-ring 16 may be centered near a base of the bulkhead 2. The user pulls the rope 9 straight down against the sidewall of the trailer. When the bulkhead 2 is adjacent the ceiling, the rope 9 is released. When the rope 9 is released, the rope guide bracket 104 urges the rope 9 into the jamming cleat 102. The ridges in the jamming cleat 104 grip the rope 9, pull the rope 9 deeper into the grove 110, and jam the rope in place, thereby securing the bulkhead 2 at the desired height.

The rope guide bracket 104 also provides a safety feature that prevents a run-away rope. If a user lets go of the rope 9, for whatever reason, the rope guide bracket 104 will urge the rope 9 into the jamming cleat 102 and prevent the bulkhead 2 from free-falling to the ground.

Figure 8:
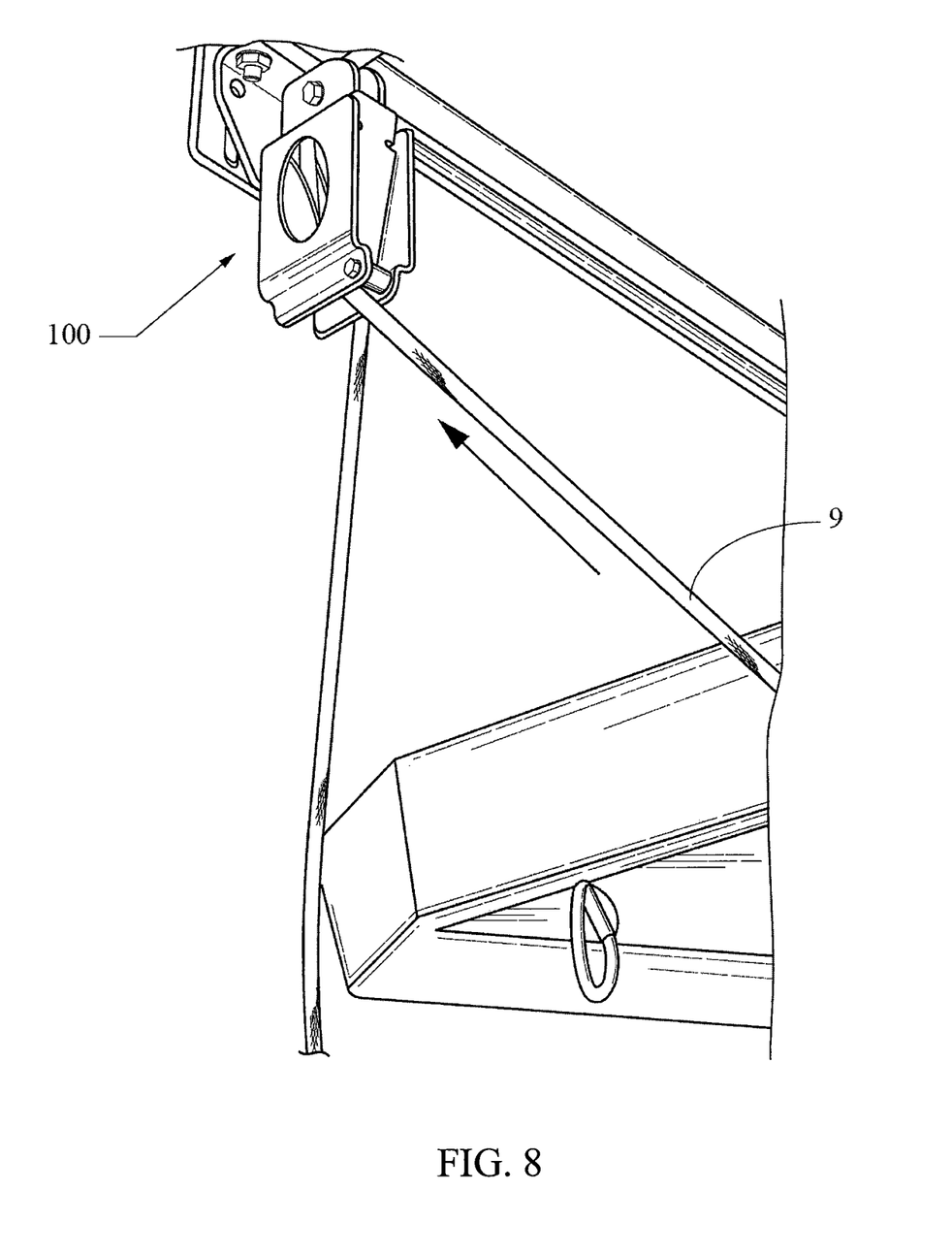
FIG. 8 is a perspective view of one embodiment of a lift mechanism in use to lower a bulkhead to a vertical position.

In order to lower the bulkhead 2, the user pulls the other end of the rope 9 away from jamming cleat 102 (e.g., toward the center of the trailer) so that the rope 9 is pulled out of the groove 110. The user applies just enough tension to the rope 9 to keep the rope 9 out of the jamming cleat 102 and slowly allows the rope 9 to pass through the lift assembly 1, thereby lowering the bulkhead 2 to the ground. (See FIG. 8).

Figure 9:
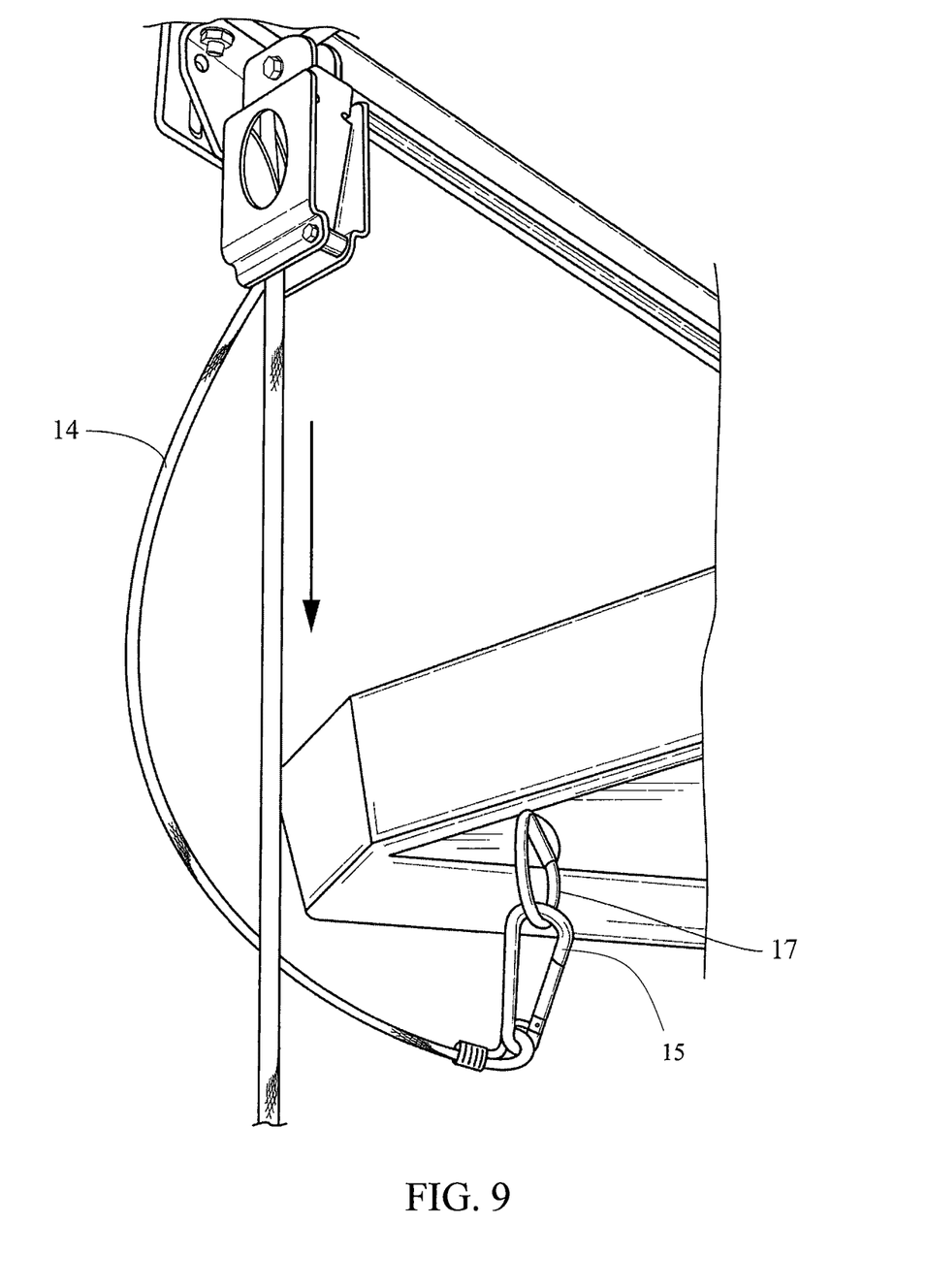
FIG. 9 is a perspective view of a bulkhead adjacent a ceiling of a trailer that is secured with a safety chain.

As shown in FIG. 9, the lift system 1 may also include a safety leash 14 that includes a safety hook 15. The safety hook 15 may attach the safety leash 14 to a D-ring 17 on the bulkhead 2 when the bulkhead 2 is adjacent the ceiling. The safety leash 14 provides an added measure of protection such that the bulkhead 2 does not fall uncontrollably and injure someone.

Figure 10:
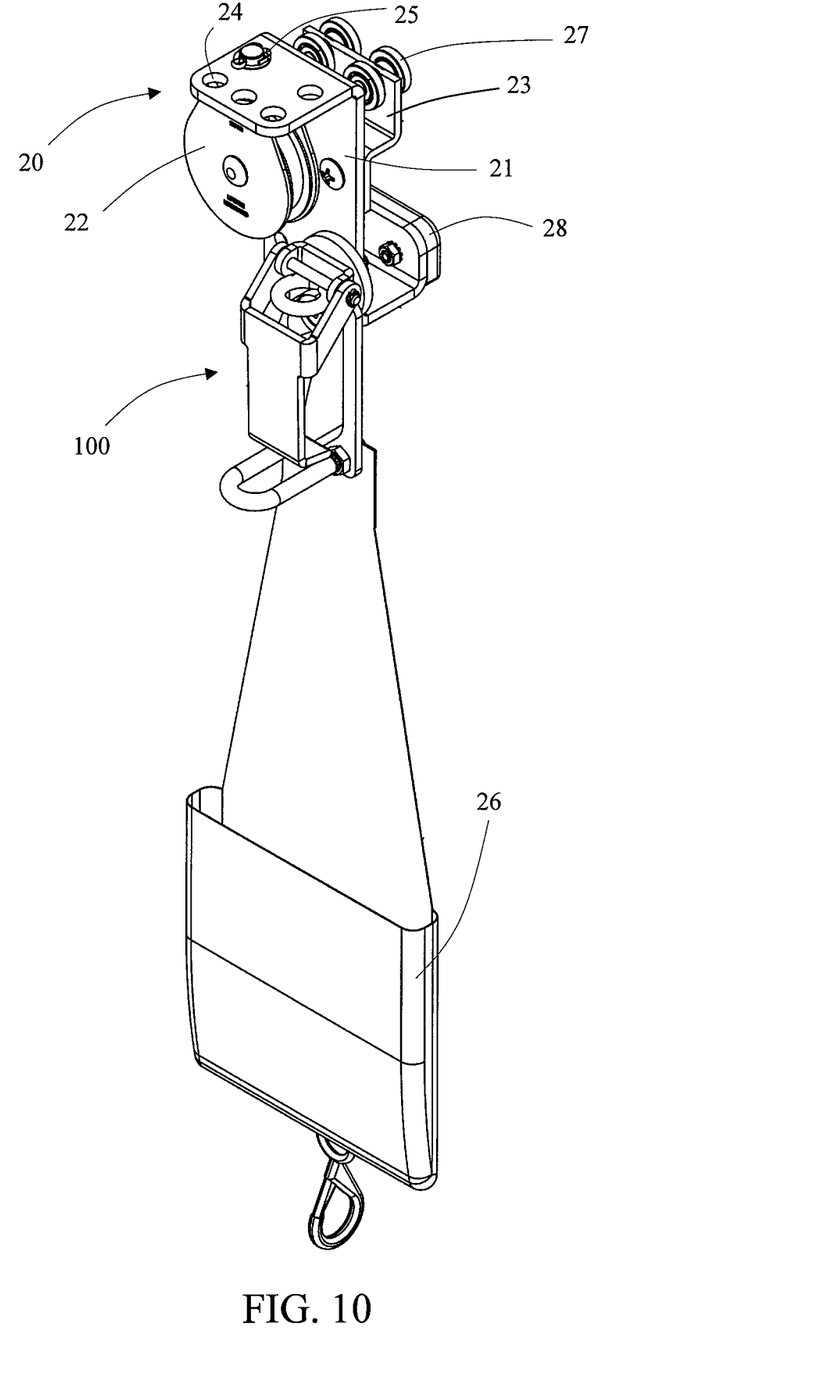
FIG. 10 is a perspective view of one embodiment of a lift system.

FIG. 10 shows one embodiment of a lift system 1 that includes the lift mechanism 100 or a different lift mechanism rotatably attached to a ceiling mechanism 20. The ceiling mechanism 20 includes a frame 21 and both a pulley 22 and a trolley frame 23 attached to the frame 21. Part of the pulley 22 is inserted into one of a plurality of holes 24 in the frame 21 and is rotatably attached to the frame 21 with a cotter pin 25. The trolley frame 23 is attached to the frame 21 with a plurality of nut/bolt combinations (e.g., two nut/bolt combinations) at corresponding holes in the frame 21 and the trolley frame 23. An axis of rotation of the pulley 22 may be offset from an axis of rotation of the lift mechanism 100 relative to the frame 21, such that a rope may more easily be passed over the pulley 22 and through the lift mechanism 100. In one embodiment, the lift system also includes a rope bag 26 to collect and secure the rope passed through the lift mechanism 100.

A plurality of wheels 27 (e.g., four wheels 27) are rotatably attached to the trolley frame 23. The plurality of wheels 27 travel in or on one of the longitudinal tracks 4 or the transverse tracks 5, such that the lift system 1 may be positioned in front of a bulkhead 2 to be lifted.

In one embodiment, the ceiling mechanism 20 includes a wall shim 28 that is attached to the frame 21 below the trolley frame 23. The wall shim 28 may be attached to the frame 21 using a plurality of nut/bolt combinations (e.g., two nut/bolt combinations) at corresponding holes in the frame 21 and the wall shim 28. The wall shim 28 may abut a wall of the trailer to help maintain the lift system 1 in a vertical orientation.

It is intended that the foregoing detailed description be regarded as illustrative rather than limiting, and that it be understood that it is the following claims, including all equivalents, that are intended to define the spirit and scope of this invention.

The invention claimed is:

1. A lift mechanism comprising:
   a main bracket,
   a pulley that is rotatably attached to the main bracket;
   a jamming cleat that is disposed within the main bracket;
   a guide bracket rotatably attached to the main bracket, the guide bracket being operable to urge a tensile lifting member toward the jamming cleat when in the rest position; and,
   a pin;
   wherein the pulley and the guide bracket are rotatably attached to the main bracket with the pin.

2. The lift mechanism of claim 1, wherein the guide bracket comprises a projection that extends toward the jamming cleat.

3. The lift mechanism of claim 1, wherein the main bracket comprises a pair of opposing side walls.

4. The lift mechanism of claim 3, wherein at least one of the side walls includes an opening adjacent the jamming cleat.

5. The lift mechanism of claim 3, wherein each of the sidewalls comprises an opening adjacent the jamming cleat.

6. The lift mechanism of claim 1, wherein the jamming cleat comprises a groove that is defined by opposing faces, and the opposing faces include a plurality of substantially parallel ridges.

7. The lift mechanism of claim 6, wherein the ridges are inclined upward and toward a base of the jamming cleat.

8. The lift mechanism of claim 1, further comprising a mounting bracket, wherein the main bracket being rotatably attached to the mounting bracket.

9. The lift mechanism of claim 8, wherein the main bracket may rotate in an arc about an axis defined by a fastener that attaches the main bracket to the mounting bracket.

10. A lift assembly for lifting a bulkhead in a trailer that has a ceiling and a sidewall, the lift assembly comprising
    a first pulley that is rotatably attached to the ceiling of the trailer;

a lift mechanism that comprises a main bracket, a second pulley that is rotatably attached to the main bracket by a pin, and a jamming cleat; and a tensile member, wherein the tensile member is routed over the first pulley and the second pulley; and wherein the lift mechanism further comprises a guide bracket that is rotatably attached to the main bracket by the pin and is operable to urge the tensile member toward the jamming cleat when in a rest position.

11. The lift assembly of claim 10, wherein the first pulley is attached directly to the ceiling of the trailer.

12. The lift assembly of claim 10, wherein the first pulley is attached to a track that is located adjacent the ceiling of the trailer.

13. The lift assembly of claim 10, wherein the lift mechanism is adjacent the sidewall of the trailer.

14. The lift assembly of claim 10, wherein the jamming cleat is parallel to the sidewall of the trailer.

15. The lift assembly of claim 10, wherein the jamming cleat is operable to engage the tensile member.

16. The lift assembly of claim 10, wherein the guide bracket comprises a projection that extends toward the jamming cleat.

17. The lift assembly of claim 10, further comprising a mounting bracket attached to the trailer, wherein the main bracket is rotatably attached to the mounting bracket.

18. The lift assembly of claim 10, further comprising a mounting bracket attached to a track adjacent the ceiling of the trailer, wherein the main bracket is rotatably attached to the mounting bracket.

* * * * *